United States Patent
Wong et al.

(10) Patent No.: US 7,023,421 B2
(45) Date of Patent: Apr. 4, 2006

(54) SUBSCRIBER DEVICE WITH ADAPTABLE USER INTERFACE AND METHOD THEREOF

(75) Inventors: Daniel Wong, Wildwood, IL (US); Michael Charlier, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 213 days.

(21) Appl. No.: 10/304,712

(22) Filed: Nov. 26, 2002

(65) Prior Publication Data

US 2004/0100511 A1    May 27, 2004

(51) Int. Cl.
*G09G 5/00*    (2006.01)

(52) U.S. Cl. .................. 345/156; 455/550; 455/566

(58) Field of Classification Search ........ 345/168–172, 345/156; 455/550, 575, 566, 40, 41, 90–90.03; 341/22, 23; 379/433.01, 433.11, 428.01, 379/433.13
See application file for complete search history.

(56) References Cited

U.S. PATENT DOCUMENTS

| | | | |
|---|---|---|---|
| 6,014,573 A * | 1/2000 | Lehtonen et al. ........ 455/569.1 |
| 6,580,932 B1 * | 6/2003 | Finke-Anlauff ............. 455/566 |
| 6,611,693 B1 * | 8/2003 | Soini et al. ................. 455/566 |
| 6,782,281 B1 * | 8/2004 | Nagasawa ................ 455/575.3 |
| 2003/0064758 A1 * | 4/2003 | Mizuta et al. |
| 2003/0068988 A1 * | 4/2003 | Janninck et al. |
| 2003/0078069 A1 * | 4/2003 | Lindeman |
| 2003/0104789 A1 * | 6/2003 | Torri et al. |

* cited by examiner

*Primary Examiner*—Regina Liang
*Assistant Examiner*—Jennifer T. Nguyen
(74) *Attorney, Agent, or Firm*—Charles W. Bethards (57) ABSTRACT

An adaptable user interface and method thereof for a subscriber device (FIG. 1, FIG. 2 et sequence) includes a plurality of keys (205, 207) arranged and constructed to be configured in one of a first configuration (FIG. 2) and a second configuration (FIG. 3); and a controller 105, coupled to the plurality of keys, operable to: detect when the plurality of keys are in the first configuration or second configuration and if so, control the subscriber device to perform a first function or second function corresponding to the detected configuration.

29 Claims, 5 Drawing Sheets

| KEY | NAVIGATION KEYS ORIENTATION | | | |
|---|---|---|---|---|
| | UP | LEFT | RIGHT | DOWN |
| UP KEY | UP | LEFT | RIGHT | DOWN |
| DOWN KEY | DOWN | RIGHT | LEFT | UP |
| LEFT KEY | LEFT | DOWN | UP | RIGHT |
| RIGHT KEY | RIGHT | UP | DOWN | LEFT |

SUBSCRIBER DEVICE WITH ADAPTABLE USER INTERFACE AND METHOD THEREOF

FIELD OF THE INVENTION

This invention relates in general to user interfaces, and more specifically to a device having an adaptable user interface and methods thereof.

BACKGROUND OF THE INVENTION

User interfaces or graphical user interfaces and devices, such as cellular handsets and the like are known. Typically these subscriber devices, such as the cellular handsets have a user interface that is arranged to facilitate effective interaction between a user and a telephone. Normally these interfaces have a keypad that includes a set of numeric keys as well as additional keys, such as Send, End, and Menu keys.

Manufacturers and suppliers of subscriber devices have started to include additional features, such as various forms of gaming functionality, with the devices. Often this gaming functionality includes games that will be familiar to users of home gaming systems. Most of these gaming systems include a handheld game control device that facilitates the user interface and interaction with the gaming system. Unfortunately there is little or no similarity between the user interface for a typical subscriber device, such as a cellular handset and a handheld game control unit and thus users of the cellular handsets with gaming functionality are typically not satisfied. Clearly a need exists for a more user friendly and flexible user interface.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

In overview form the present disclosure concerns devices or subscriber devices that provide services or functionality and utility to a user of the device and more specifically such devices that provide multiple diverse functionality such as telephone or cellular telephone and gaming functionality for users thereof. More particularly various inventive concepts and principles embodied in adaptable user interfaces and methods for providing such interfaces for the convenience and advantage of users are discussed. The devices that are of particular interest are cellular handsets that are full featured and may include one or more capabilities in addition to the telephone functions, such as gaming, messaging, Internet browsing, personal organizer or personal digital assistant capabilities or the like. Although not required these more feature rich subscriber devices often are arranged and constructed to operate on higher bandwidth systems such as GPRS (General Packet Radio System) systems, or wideband CDMA (code division multiple access) systems or systems that are packet data enabled and that enable connectivity or sessions with IP (Internet Protocol) based networks, including for example packet data based systems such as $3^{rd}$ generation or UMTS (Universal Mobile Telephone Services) systems.

As further discussed below various inventive principles and combinations thereof are advantageously employed to provide alternative operating configurations or keypad layouts for a user interface to a subscriber device depending on user actions, desires, and preferences, thus alleviating various problems associated with known user interfaces while facilitating a fuller range of features, options and applications for the subscriber device provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles when implemented, are best supported with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Figure 1:
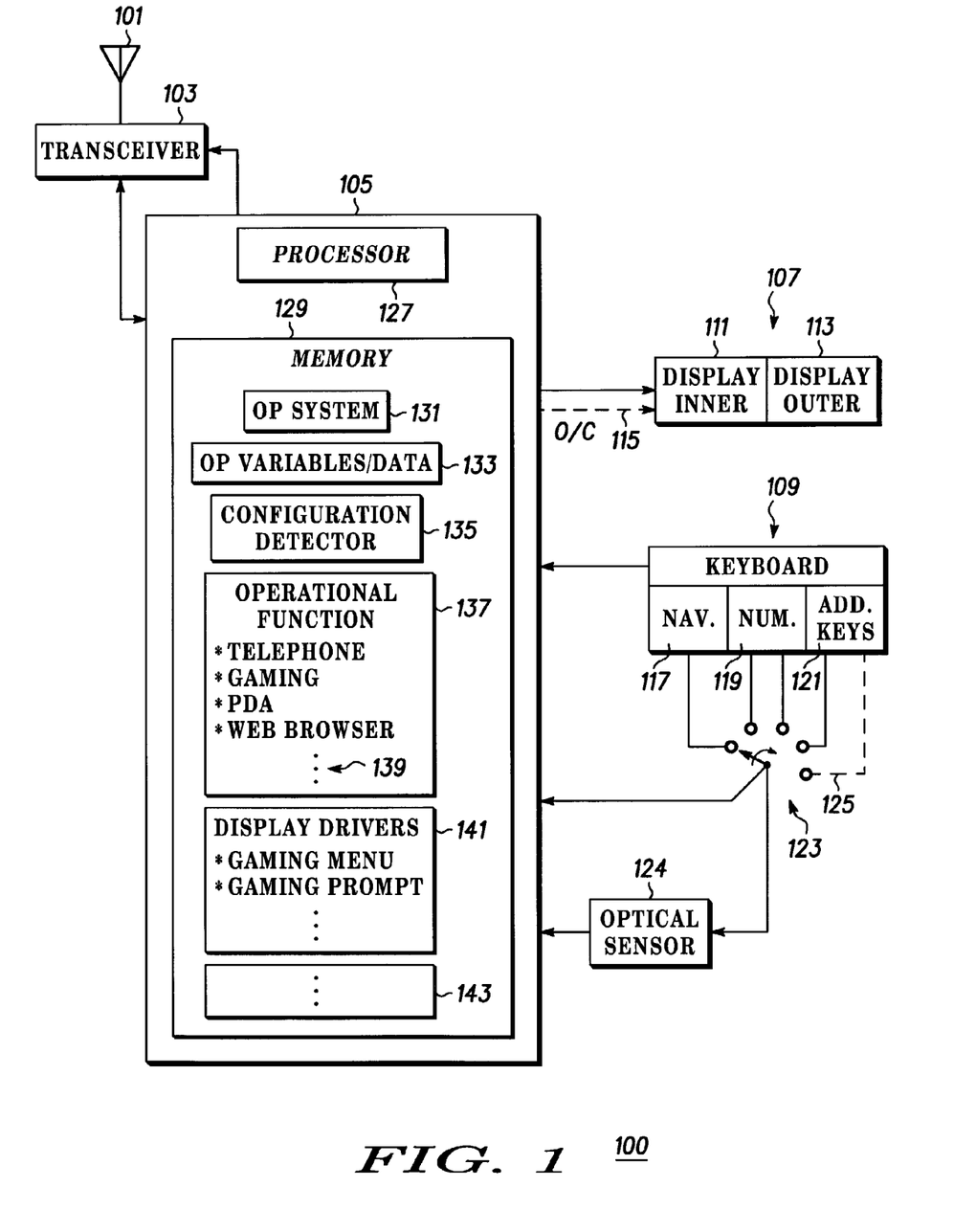
FIG. 1 depicts a block diagram of a preferred embodiment of a subscriber device with an adaptable user interface.

Referring to FIG. 1, a block diagram of a preferred embodiment of a subscriber device 100 with an adaptable user interface according to the present disclosure will be discussed and described. The subscriber device 100 includes the antenna 101 that operates to radiate and absorb radio frequency signals that are transmitted or sent from or received by a transceiver 103 of the subscriber device as is known. The transceiver 103 interactively operates with a controller 105 to provide to or accept or receive from the controller 105, messages or signals corresponding thereto as is also known. The controller 105 is coupled to and operates together with a display 107 and a keyboard 109 to affect a user interface. The controller drives the display that may include an inner display 111 and outer display 113, when the subscriber device is a flip style device such that the inner display may only be fully visible when suitably arranged or when the device is open. The particular display may be selected via the O/C (open/closed) control line 115.

The keyboard 109 or a plurality of keys or set of keys provides signals to the controller 105 and further includes, preferably one or more navigation keys 117, numeric keys 119, and other or additional keys 121. The plurality of keys or some portion thereof is arranged and constructed to assume or be arranged in two or more physical configurations with for example one configuration facilitating telephone functions and other configurations facilitating gaming functions, etc. The particular configuration is communicated to the controller via the position-sensing switch 123 that is shown with four positions and a further intermediate position 125. Alternatively or in addition for some functions, such as gaming functions that require a continuous or quasi continuous position indication (steering wheel) the optical sensor 124 may be utilized to provide an appropriate input signal to the controller 105. Generally the keys comprising the plurality of keys are known and activation of a key may change a resistance or capacitance in order to provide a signal to the controller. It is possible that some of the keys may be a physical key or a virtual key that is part of the display. The display is also known and may be a liquid crystal display or the like. If the keys are part of a virtual keyboard the display will need to be touch sensitive or the like in order to convey information to the controller 105.

The controller 105, preferably, includes a processor 127 that is, preferably, a known micro-processor based element that is widely available and may include one or more micro processors and one or more digital signal processors depending on the precise responsibilities of the controller with respect to signaling duties that are not here relevant. The processor 127 is coupled to a memory 129 that may be a combination of known RAM, ROM, EEPROM or magnetic memory that among other items, such as phone and address books, and standard or canned messages, will store operating software or code 131, and various operating variables and parameters 133 for the processor. This operating software when executed by the processor will result in the processor performing the requisite functions of the subscriber device such as interfacing with the transceiver, display and keyboard and so on including others that will be further described below. As depicted the memory includes additional routines that represent configuration detection 135, Operational functionality 137 including two or more of telephone, gaming, personal digital assistant, web browsing, and others 139. Of course the gaming functionality would likely include a plurality of games that may be selected. Further shown are display drivers 141 that may be used to drive the display appropriately depending on the configuration of the plurality of keys and other device status information. The display drivers show specifically a gaming menu and gaming prompts that will be discussed further below. The reader will appreciate that this listing is merely a brief listing of exemplary routines that will be required or advantageous in effecting a user interface and that additional routines and optional applications 143 that may be stored in the memory have not been specifically mentioned.

Briefly in operation, the subscriber device 100 with the adaptable user interface includes a plurality of keys 109 that are arranged and constructed to be configured in either a first configuration or a second configuration or more configurations and a controller 105, coupled to the plurality of keys, operable to: detect via the input from position or position-sensing switch 123 or optical sensor 124 and the configuration detection routine 135, whether the plurality of keys are in the first configuration and if so, control the subscriber device to perform a first function corresponding to the first configuration, via the appropriate one of the operational routines 137; and detect whether the plurality of keys are in the second configuration and if so, control the subscriber device to perform a second function corresponding to the second configuration. For example, one configuration of the plurality of keys may facilitate a gaming function and another configuration of the plurality of keys may facilitate a cellular phone function.

Figure 2:
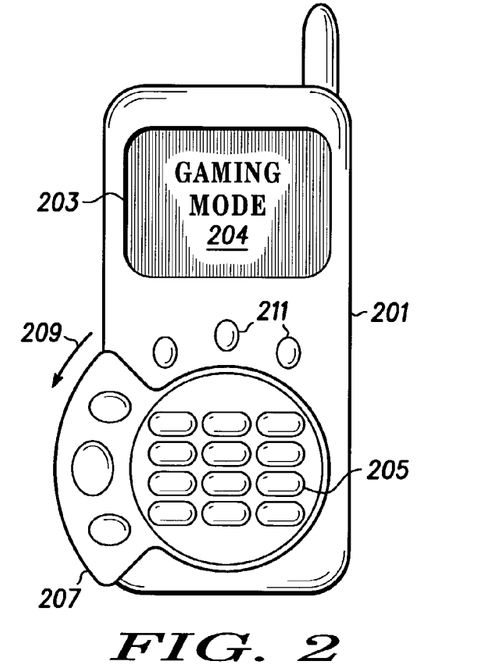
FIG. 2 depicts a front elevation view of an exemplary embodiment of a subscriber device with an adaptable user interface.

This will be better appreciated by referring to one or more of the exemplary elevation views of FIG. 2 through FIG. 5. Referring to FIG. 2, a front elevation view of an exemplary embodiment of a subscriber device 201 with an adaptable user interface will be discussed and described. The subscriber device has a display 203, representatively shown displaying a gaming mode 204 and a plurality of keys including numeric keys 205 and navigation keys 207 that are shown rotated through an angle 209, approximating 90 degrees, to a horizontal relationship with the numeric keys where the rotation has revealed additional keys 211. It should be noted that the different configurations are, preferably, physical arrangements or rearrangements of the keys. Particularly a first configuration of the plurality of keys is, preferably, a first physical arrangement of the plurality of keys and a second configuration of the plurality of keys is a second physical arrangement of the plurality of keys. Four different arrangements or configurations are depicted by FIG. 2 through FIG. 5.

Those familiar with typical game control units or controllers will understand and appreciate that having the navigation keys arranged to the side of the controller and the numeric keypad as in FIG. 1 is a more typical layout. It is as well generally believed to be more natural and comfortable for playing many games. Basically a typical layout of a keypad for a cellular phone, for example, where most or many of the navigation or keys other than the numeric keys are laid out in a vertical relationship to the numeric keys renders the phone nearly useless or at least quite clumsy for playing many games. The users hands interfere with each other, often overlapping, when attempting to execute required gaming maneuvers. A much more comfortable and useful layout results when the navigation keys for the game are arranged to the side of the numeric keypad.

Figure 3:
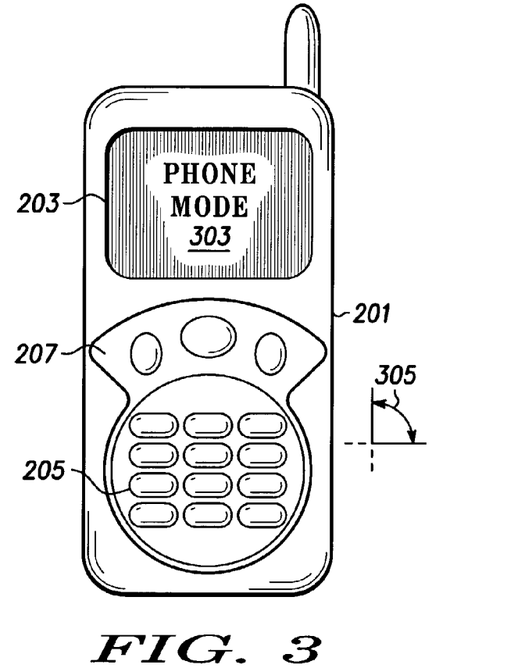
FIG. 3 through FIG. 5 illustrates additional front elevation views of a subscriber device of depicting a variety of configurations of a plurality of keys.
Figure 4:
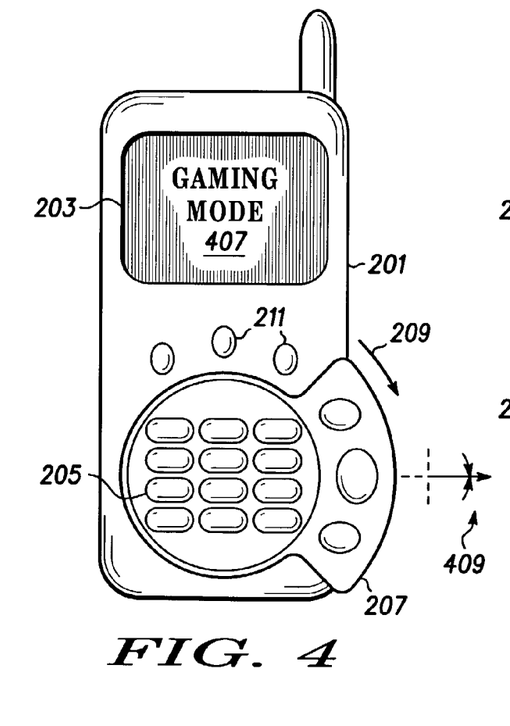
Figure 5:
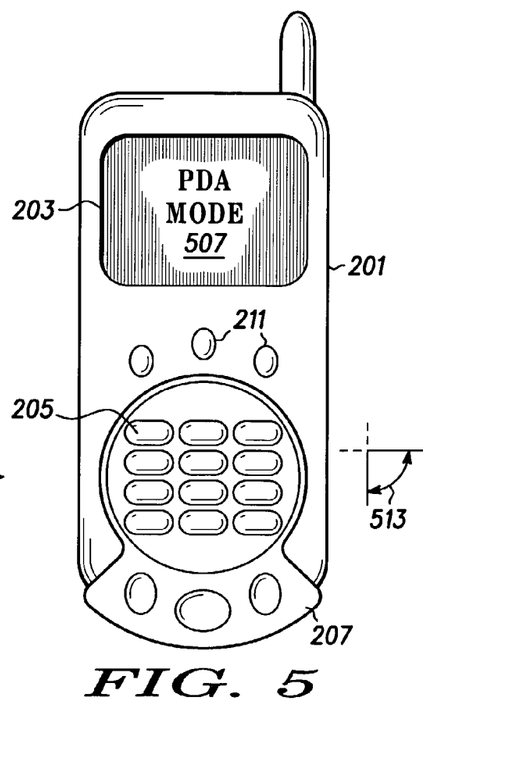

FIG. 3, FIG. 4, and FIG. 5, which illustrate additional front elevation views of a subscriber device depicting a variety of configurations of the plurality of keys, will now be discussed and described. For example, FIG. 3 depicts a configuration wherein the navigation keys 207 are shown rotated at an angle 305 to a vertical relationship with the numeric keys 205. The display 203 shows in an exemplary fashion that the subscriber device 201 is in a telephone mode 303 in this configuration.

Referring to FIG. 4, the display 203 is representatively shown displaying a further gaming mode 407. In this configuration, the plurality of keys including navigation keys 207 are shown rotated at an angle 409 to a horizontal relationship with the numeric keys where the rotation has revealed the additional keys 211. Note that this configuration may facilitate use by right-handed users, as the navigation keys 207 are positioned to the right of the numeric keys 205. This in contrast to the configuration shown in FIG. 2 wherein the navigation keys 207 are positioned to the left of the numeric keys 205, thus perhaps facilitating use by left-handed users when in a gaming mode.

FIG. 5 depicts a configuration wherein the navigation keys 207 are shown rotated at an angle 513 to a vertical or reverse vertical relationship with the numeric keys 205. The display 203 shows that the subscriber device 201 is in a PDA mode 507 in this configuration. By reflecting on the different configurations you will note that a subscriber device has been shown where one or more of the plurality of keys, for example the navigation keys is rotated and positioned at a first angle relative to others of the plurality of keys, such as the numeric keys when in a first configuration, and that the one or more of the plurality of keys is rotated and positioned at a second angle relative to the others of the plurality of keys when in a second configuration.

The preferred construction for the plurality of keys includes a two-piece keyboard with a stationary numeric keypad that captures the rotating set of navigation keys between the housing for the subscriber device and the numeric keypad. Preferably, the numeric keypad includes a snap action or quarter turn latching mechanism to fasten the numeric keys and thus rotating keys to the subscriber device housing. A bearing surface on one or both of the subscriber device housing and numeric keypad provides a bearing surface for the rotating keypad to rotate about. A detent system or latching arrangement is preferably arranged to hold or bias the navigation keys or rotating portion to or in one of the predetermined locations depicted in FIG. 2 through FIG. 5. The detent system relies on a slight interference fit between two parts as is known, whereas an on/off latching mechanism may be more suitable if the rotating keys or portion will be used for continuous or quasi-continuous positioning. The optical position sensor may be accommodated via an opening in the subscriber device housing located below the rotating portion and a known pattern on the rotating portion. The position sensing switch would rely on a proximity relationship between electrical circuits or a contact only available at the predetermined positions corresponding to one of the configurations. Some experimentation is expected in order to obtain a rotating key portion with the appropriate relative sizes and physical rigidity that will provide the appropriate feel for gaming, etc. but such experimentation will be well within the wherewithal of one of ordinary skill given the concepts and principles disclosed.

The various configurations of the plurality of keys includes a configuration with one or more of the plurality of keys arranged in a vertical orientation relative to others of the plurality of keys and another configuration of the plurality of keys where the one or more of the plurality of keys are arranged in a horizontal orientation relative to the others of the plurality of keys. Preferably the one or more of the plurality of keys that are reoriented include navigation keys 207 and the others of the plurality of keys include the numeric keys 205. The plurality of keys may be arranged, constructed and configured in different configurations in order to facilitate, respectively, use by right and left handed users. The additional keys that are revealed when the plurality of keys, specifically navigation keys are in a rotated configuration may be used for a function corresponding to the original position of the navigation keys or the function corresponding to the new position. For example suppose the subscriber device is in a gaming configuration such as FIG. 2 or FIG. 3 and an incoming phone call is detected. One of the additional keys 211 may be used to answer the phone call, presumably pausing the game in process. Alternatively, the additional keys can play a roll in the ongoing game.

As the subscriber device, specifically plurality of keys is reconfigured from one arrangement to another the position of the keys is detected by the switched and the configuration detector routine 135 and different operational functions, such as a telephone, gaming, personal digital assistant, internet browser, text messaging, etc. are selected and executed by operational routines 137 and the display is coupled to and driven by the controller to provides a display presentation that corresponds to the particular configuration of the plurality of keys. Furthermore it is contemplated that another configuration of the plurality of keys is available that is intermediate between a first and a second configuration, such as in between the configurations shown in FIG. 2 and FIG. 3 and indicated at 125 in FIG. 1. In this intermediate configuration pausing the gaming function and enabling a monitoring operation associated with the cellular phone function may occur. This may be used, for example, when a game is in process and a phone call is detected. By moving the navigation keys to the intermediate location the user would pause the game in process and be provided a caller ID display of the inbound phone call. The call could be answered by moving the navigation keys to the position in FIG. 3 or by using on the additional keys.

Figure 6:
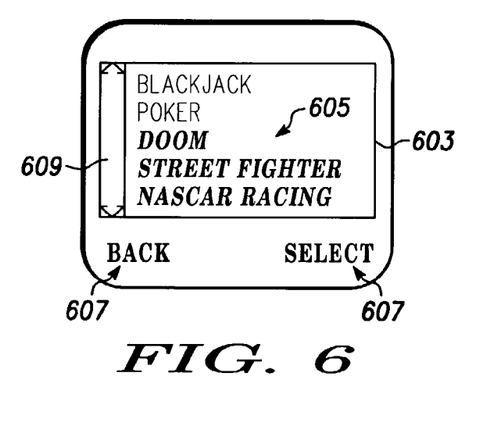
FIG. 6 and FIG. 7 depict an exemplary gaming display for the subscriber device of FIG. 2–FIG. 5.
Figure 7:
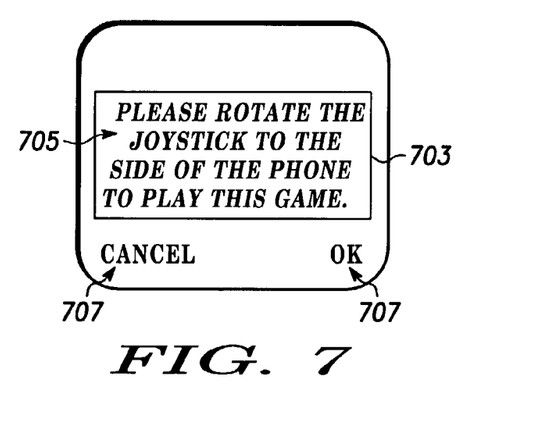

Referring to FIG. 6 and FIG. 7, exemplary gaming displays for the subscriber device of FIG.2–FIG. 5, will be discussed and described. It should be noted that a different configuration of the plurality of keys is not always required to play a game.

For example solitaire and other card like games may be played quite satisfactorily when the subscriber device is arranged as in FIG. 3 or FIG. 5. FIG. 6 depicts a display of a gaming menu 603 that allows a user to select a game. Generally the games 605 that are available on the device can be scrolled through, up or down 609, using the center navigation key. One of the games, after being highlighted, can be selected 607 using the right hand key of the 3 keys that move when being reconfigured. If the user wishes to go "BACK" 607 to an earlier menu, gaming or otherwise, the left hand key of the rotating keys may be activated. In any event, preferably, one or more of the listed games are highlighted or bolded or otherwise rendered visually distinct in order to show that they require or are best played using a configuration other than the configuration in which the plurality of keys is currently positioned.

When one of the visually distinct games is selected, FIG. 7 depicts an exemplary gaming display of a gaming prompt 703 that may be displayed for the subscriber device of FIG.2–FIG. 5. The display shows instructions 705 for the gaming prompt 703. The instructions 705 or prompt inform the user to rotate the navigation keys to the side of the handset, and therefore reconfigure the subscriber device 2 to the corresponding configuration, shown in FIG. 2 or FIG. 3. This exemplary gaming display is shown on the display 703 preferably after the user has highlighted and selected a visually distinct game from the selection list 605 or gaming menu 603 that requires a configuration other than the configuration in which the subscriber device is currently arranged. Keys 707 allow the user to confirm that the reconfiguration of the subscriber device is complete or will be undertaken or to cancel the game. Note that this is merely a representative prompt or message to assist the user and that others would also be available.

Figure 8:
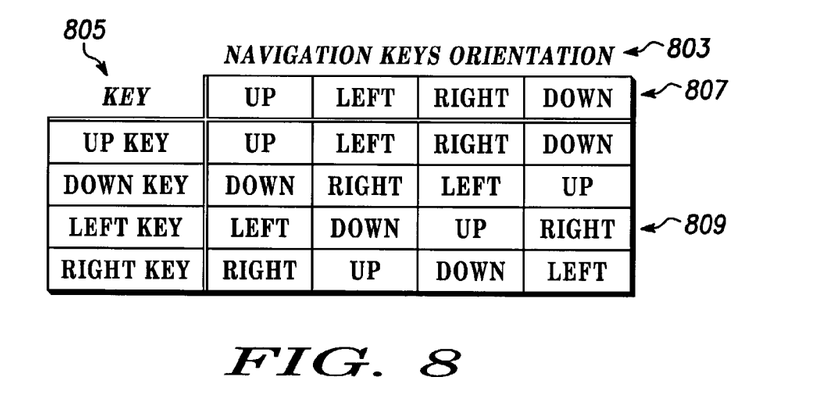
FIG. 8 shows a representative table of keys being remapped according to configuration.

Referring to FIG. 8 a representative table of keys being remapped according to a configuration will be discussed and described. Generally this may be required, for example, when one of the keys that is being rotated has an orientation related function. For example as is known, often the center key is a four position navigation button including up, down, right and left keys. FIG. 8 depicts a table of Navigation Keys Orientation 803 that shows for each key 805 as a function of the orientation of the rotating navigation keys 807 the corresponding navigation function 809. For example the UP key (col. 805), when the navigation keys are up, to the left, to the right, and down (heading 807) has a navigation function of, respectively, up, left, right, and down (first row of table 809 values).

We have discussed and described a user interface for a cellular handset or subscriber device, the user interface facilitates among others, telephone functionality and gaming functionality for the cellular handset or device. The user interface includes a display operable to present a graphical interface corresponding to one of the telephone functionality and the gaming functionality and a plurality of keys arranged and constructed to be reconfigured between one of a telephone configuration and a gaming configuration. Further included is a controller, coupled to the plurality of keys and the display, that is operable to: determine whether the plurality of keys is arranged in the telephone configuration and if so, drive the display to correspond to the telephone functionality; and determine whether the plurality of keys is arranged in the gaming configuration and if so drive the display to correspond to the gaming functionality.

Reconfiguring the plurality of keys to the gaming configuration activates the gaming functionality and activating the gaming functionality may include displaying a gaming menu or a game in process that has been paused. The plurality of keys, preferably include navigation keys that are physically reoriented and numeric keys that are not physically reoriented, the navigation keys used for navigation purposes when playing a game and the numeric keys used for other actions when playing the game. The functionality of one or more of the navigation keys is, preferably, remapped when the one or more of the navigation keys is physically reoriented. Reconfiguring the plurality of keys from a gaming configuration to the telephone configuration or a configuration intermediate pauses any game that is in process and activates the telephone functionality including, for example, displaying a corresponding presentation, such as a caller ID presentation thereby allowing an incoming call identity to be viewed. The controller is, preferably, operable to display a gaming menu when the plurality of keys is configured in the telephone configuration and a prompt to reconfigure the plurality of keys to the gaming configuration when a game is selected that is more efficiently played in the gaming configuration.

Figure 9:
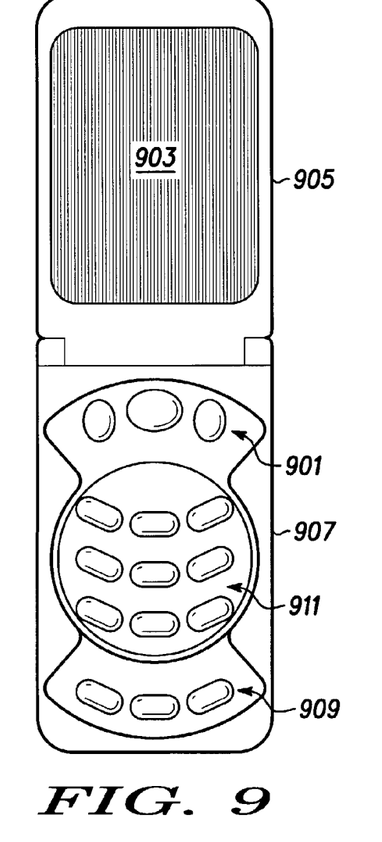
FIG. 9 through FIG. 11 depicts various front elevation views of an exemplary flip style of subscriber device with an adaptable user interface.
Figure 10:
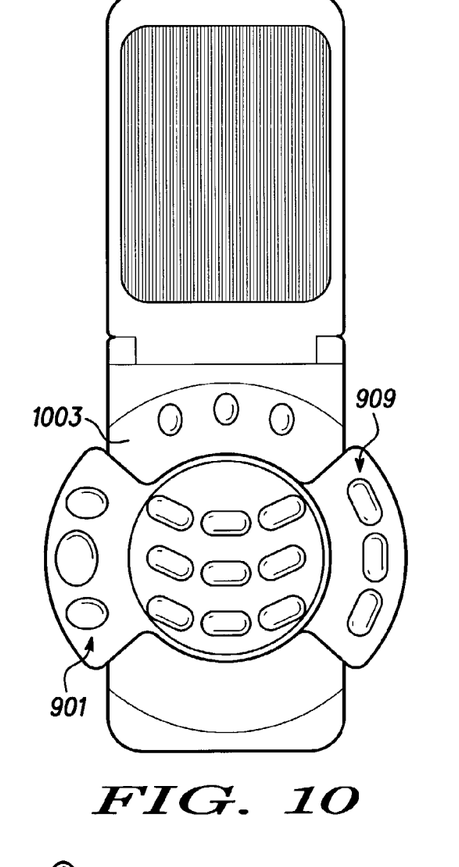
Figure 11:
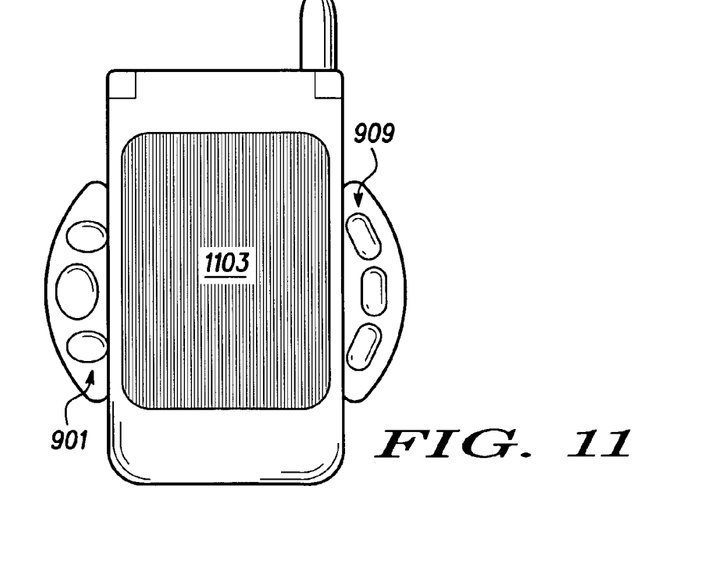

Referring now to FIG. 9 through FIG. 11, various front elevation views of an exemplary flip style cellular handset or subscriber device with an adaptable user interface will be discussed and described. Three different arrangements or configurations are depicted by FIG. 9 through FIG. 11. As previously stated above with reference to FIG. 2 through FIG. 5, those familiar with typical game control units or controllers will understand and appreciate that having the navigation keys arranged to the sides of the controller and the numeric keypad as in FIG. 10 is a more typical and useful game control interface layout. It is as well generally believed to be more natural and comfortable for playing many games.

The subscriber device as shown in FIG. 9 is a flip style handset as is known preferably including one or more displays 903 on a hinged portion 905 of the handset and a plurality of keys on another portion 907. The plurality of keys may be reconfigured in a variety of arrangements much as discussed above. The plurality of keys, preferably, include navigation keys 901 as well as other keys 909 that may be rotated about or with respect to numeric keys 911 from a vertical relationship with the numeric keys to a horizontal relationship (see FIG. 10). It should be noted that the navigation keys 901 and other or additional keys 909 are located on two opposing sections of a rotatable keypad that is shown at a vertical relationship with the numeric keys. A first of the opposing sections, which includes navigation keys 901, is positioned above the numeric keys 911, and a second of the opposing sections, which may include additional navigation keys, is positioned below numeric keys 911 in FIG. 9. In this particular configuration, the subscriber device is said to be in one of the previously described modes, such as, for example, telephone mode. In the configurations shown in FIG. 9 through 11, the plurality of keys, specifically rotating sections and the keys thereon, are configurable to provide a continuous or quasi continuous signal corresponding to an angle of rotation about an axis for the plurality of keys and the controller 105 is operable to receive the signal from the above described optical sensor or detector and determine the angle of rotation or at least changes to the angle. This feature may be advantageously used, for example, to simulate a steering wheel or airplane control yoke or the like for games that may require or use such functions.

In FIG. 10, the navigation keys 901 and other keys 909 are shown rotated to a horizontal relationship with respect to the numeric keys where the rotation has revealed additional keys 1003. The first of the opposing sections is now positioned to the left of the numeric keys 911 and the second of the opposing sections is now positioned to the right of the numeric keys 911. Note that this configuration may facilitate use by left-handed users in a gaming mode, and may perhaps facilitate use by right-handed users in other gaming modes, depending on the particular game in operation and the user's preference.

In addition, the rotating portions may be rotated to a horizontal or reverse horizontal relationship wherein the first of the opposing sections is positioned to the right of the numeric keys 911 and the second of the opposing sections is positioned to the left of the numeric keys 911. This particular reverse horizontal configuration may also facilitate use by left-handed or right-handed users, depending on the particular game and the preference of the user. Also, additional keys (not shown) may be revealed below the numeric keys in either of the horizontal rotations of the rotating portions, which may provide additional functionality when the subscriber device is in a gaming mode. In addition to gaming, this additional configuration could be used for another of the different operational functions, such as a telephone, personal digital assistant, Internet browser, text messaging, etc.

FIG. 11 shows the subscriber device with a flip style handset in an additional configuration. The rotating portion with navigation keys 901 and additional keys 909 is positioned in the horizontal relationship as discussed above with regards to FIG. 10. However, the display 1103 is selectively visible when the handset is closed. This is accomplished by having a display that is separate from the hinged portion 905 and therefore may be visible when the handset is open or closed, or by adding an additional or second display to the outside of the subscriber device that is visible when the handset is closed. Another potential approach for presenting a display when the handset is open and closed is to enable the display and the display housing or the hinged portion to rotate about a vertical axis when the hinged portion is open. Such displays are known and typically include a shaft mechanism coupled to the hinge about which the display can rotate and a rotational encoder that tracks rotation of the display about the shaft.

Figure 12:
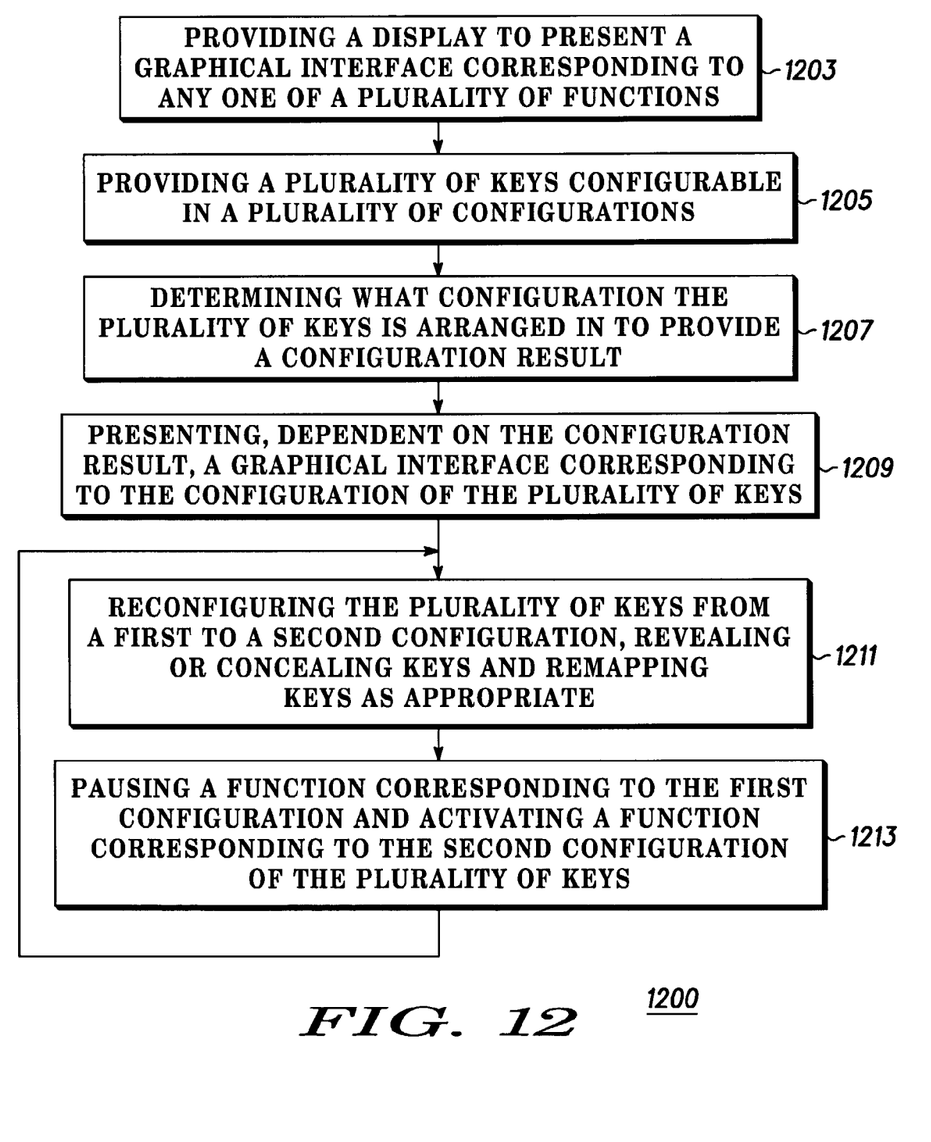
FIG. 12 shows a flow chart of a method embodiment of adapting a subscriber device to facilitate diverse functionality.

We have discussed and described a user interface for a subscriber device arranged as a flip style handset that may be open or closed and operable, when open or closed, to facilitate a user interface for among others, telephone functionality and gaming functionality for the cellular handset or device. The keys, preferably navigation keys positioned on the rotating portion, are configurable to provide a quasi continuous signal corresponding to the rotation of the plurality of keys. In addition, the controller is operable to determine the angle or relative angle of rotation of the plurality of keys. The display of the flip style handset is configurable to be selectively visible when the handset is closed, either by having a display that is separate from the hinged portion, two separate displays one each on the inside and outside of a hinged portion or a rotatable display. When the handset is closed and a display is visible, the display representatively shows a gaming mode 204, and one or more of the keys are visible and operable. In sum the display may include a first display and a second display, the first display presenting the graphical interface when the cellular handset is open and the second display presenting the graphical interface when the cellular handset is closed, where the first and second display may be one display that can be rotated along a vertical axis of the handset Referring to FIG. 12, a flow chart of a method embodiment of adapting a subscriber device to facilitate diverse functionality will be discussed and described. Since much of this discussion is analogous to the previous discussion in the context of a user interface for a cellular handset or subscriber device the discussion here will more of a summary of some earlier noted concepts and principles. The method 1200 of FIG. 12 shows a process for adapting a subscriber device to facilitate a user interface for diverse functionality. The method begins at 1203 with providing a display operable to present a graphical interface corresponding to one of a plurality of functions, such as a first function and a second function. Next, 1205 depicts providing a plurality of keys configurable in a corresponding plurality of configurations, including specifically a first configuration and a second configuration.

Thereafter, at 1207 determining what configuration the plurality of keys is arranged in to provide a configuration result is undertaken. Specifically for example, determining whether the plurality of keys is arranged in the first configuration or the second configuration to provide a configuration result is undertaken. Then the process at 1209 shows presenting, dependent on the configuration result, a graphical interface corresponding to the configuration of the plurality of keys or specifically presenting, dependent on the configuration result, the graphical interface corresponding, respectively, to the first function or the second function. Next, 1211 depicts reconfiguring the plurality of keys from one to another configuration or from the first configuration to the second configuration, revealing or concealing keys and remapping keys as appropriate. Of course and not shown for the sake of simplicity, a determination of what configuration the keys have been configured in would be undertaken is so doing. In any event, 1213 shows pausing a function corresponding to the first configuration and activating a function corresponding to the second configuration of the plurality of keys after which the method loops to the process at 1211.

As above the functions are one or more of a telephone function, a gaming function, a personal digital assistant function, and an Internet browsing function. The method may be extended by, for example, determining whether the plurality of keys is arranged in the first configuration, the second configuration, or a third configuration to provide the configuration result; and then presenting, dependent on the configuration result, the graphical interface corresponding, respectively, to the first function, the second function, or a third function corresponding to one of monitoring a telephone function and facilitating a gaming function.

The processes and user interfaces discussed above and the inventive principles thereof are intended to and will alleviate problems caused by prior art user interfaces. Using these principles of providing an adaptable user interface that may be configured according to desired functionality may facilitate user interface efficiency and friendliness and thus satisfaction. It is expected that one of ordinary skill given the above described principles, concepts and examples will be able to implement other alternative interface procedures and configurations that are subscriber device status dependent and that will also offer additional quick and efficient interface procedures. It is anticipated that the claims below cover such other examples.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A subscriber device having an adaptable user interface, the subscriber device comprising:

a plurality of keys arranged and constructed to be configured in one of a first configuration and a second configuration, the first configuration distinguished from the second configuration by a first portion of the plurality of keys being rotateable in a first plane tat is parallel to a second plane in which an other portion of the plurality of keys is disposed, the first portion of the plurality of keys rotateable about an axis that is perpendicular to the second plane and passes through the other portion of the plurality of keys; and a controller, coupled to the plurality of keys, operable to:
detect whether the plurality of keys are in the first configuration and if so, control the subscriber device to perform a first function corresponding to the first configuration; and
detect whether the plurality of keys are in the second configuration and if so, control the subscriber device to perform a second function corresponding to the second configuration.

2. The subscriber device of claim 1 wherein the first configuration of the plurality of keys facilitate a gaming function and the second configuration of the plurality of keys facilitate a cellular phone function.

3. The subscriber device of claim 2 wherein a third configuration of the plurality of keys intermediate between the first and the second configuration pauses the gaming function and enables a monitoring operation associated with the cellular phone function.

4. The subscriber device of claim 1 wherein the first configuration of the plurality of keys is a first physical arrangement of the plurality of keys and the second configuration of the plurality of keys is a second physical arrangement of the plurality of keys.

5. The subscriber device of claim 1, wherein:
one or more of the plurality of keys is rotated and positioned at a first angle relative to others of the plurality of keys when in the first configuration, and
the one or more of the plurality of keys is rotated and positioned at a second angle relative to the others of the plurality of keys when in the second configuration.

6. The subscriber device of claim 1 further including a display coupled to and driven by the controller that provides a first display presentation when the plurality of keys are in the first configuration and a second display presentation when the plurality of keys are in the second configuration.

7. The subscriber device of claim 6 wherein the first configuration of the plurality of keys includes one or more of the plurality of keys arranged in a vertical orientation relative to others of the plurality of keys and the second configuration of the plurality of keys includes the one or more of the plurality of keys arranged in a horizontal orientation relative to the others of the plurality of keys.

8. The subscriber device of claim 7 wherein the one or more of the plurality of keys include navigation keys and the others of the plurality of keys include numeric keys.

9. The subscriber device of claim 1 wherein the plurality of keys is further arranged and constructed to be configured in a third configuration, the second and third configurations facilitating, respectively, use by right and left handed users.

10. The subscriber device of claim 1 wherein when the plurality of keys are in the second configuration additional keys are revealed that may be used for one of the first function and the second function.

11. The subscriber device of claim 1 wherein the first function and the second function are different and are selected from one of; a gaming function, a telephone function, a personal digital assistant function and an Internet browsing function.

12. A user interface for a cellular handset, the user interface facilitating telephone functionality and gaming functionality of the cellular handset, the user interface comprising:
a display operable to present a graphical interface corresponding to one of the telephone functionality and the gaming functionality;
a plurality of keys arranged and constructed to be reconfigured between one of a telephone configuration and a gaming configuration the gaming configuration distinguished from the telephone configuration by one or more of the plurality of keys being rotateable about an axis that passes perpendicularly through an area of a plane, the area having a boundary defined by a portion of the plurality of keys the portion excluding the one or more of the plurality of keys;
a controller, coupled to the plurality of keys and the display, operable to:
determine whether the plurality of keys is arranged in the telephone configuration and if so, drive the display to correspond to the telephone functionality; and
determine whether the plurality of keys is arranged in the gaming configuration and if so drive the display to correspond to the gaming functionality.

13. The user interface of claim 12 wherein reconfiguring the plurality of keys to the gaming configuration activates the gaming functionality.

14. The user interface of claim 13 wherein activating the gaming functionality includes displaying one of a gaming menu and a game in process that has been paused.

15. The user interface of claim 13 wherein the plurality of keys include navigation keys that are physically reoriented and numeric keys that are not physically reoriented, the navigation keys used for navigation purposes when playing a game and the numeric keys used for other actions when playing the game.

16. The user interface of claim 15 wherein the functionality of one or more of the navigation keys is remapped when the one or more of the navigation keys is physically reoriented.

17. The user interface of claim 12 wherein reconfiguring the plurality of keys to the telephone configuration pauses any game that is in process and activates the telephone functionality including displaying a corresponding presentation.

18. The user interface of claim 12 wherein the plurality of keys is arranged and configurable so an incoming call identity can be viewed.

19. The user interface of claim 12 wherein the controller is operable to display a gaming menu when the plurality of keys is configured in the telephone configuration and a prompt to reconfigure the plurality of keys to the gaming configuration when a game is selected that is more efficiently played in the gaming configuration.

20. The user interface of claim 12 wherein the plurality of keys are configurable to provide a quasi continuous signal corresponding to an angle of rotation about the axis for the plurality of keys and the controller is operable to determine the angle of rotation.

21. The user interface of claim 12, wherein:
the cellular handset is a flip style handset that is one of open and closed;
the plurality of keys including one or more keys that are visible and operable when the cellular handset is closed and only when the plurality of keys is configured in the gaming configuration; and
the display being selectively visible when the cellular handset is closed,
wherein the display presents the graphical interface corresponding to the gaming functionality when the handset is closed and the plurality of keys is configured in the gaming configuration.

22. The user interface of claim 21 wherein the display is visible when the display is rotated about a vertical axis and the cellular handset is closed.

23. The user interface of claim 21 wherein the display includes a first display and a second display, the first display presenting the graphical interface when the cellular handset is open and the second display presenting the graphical interface when the cellular handset is closed.

24. A method of adapting a user interface to facilitate diverse functionality, the method comprising:
providing a display operable to present a graphical interface corresponding to one of a first function and a second function;

providing a plurality of keys configurable in one of a first configuration and a second configuration, the first configuration distinguished from the second configuration by a first portion of the plurality of keys being rotated in a first plane around and outside of an area with a perimeter defined to include only an other portion of the plurality of keys, the first plane lying parallel to a second plane defined by the other portion of the plurality of keys;

determining whether the plurality of keys is arranged in the first configuration or the second configuration to provide a configuration result; and presenting, dependent on the configuration result, the graphical interface corresponding, respectively, to the first function or the second function.

25. The method of claim 24 further including reconfiguring the plurality of keys from the first configuration to the second configuration and responsive thereto activating the second function.

26. The method of claim 25 wherein the reconfiguring the plurality of keys from the second configuration to the first configuration pauses the second function.

27. The method of claim 25 wherein the reconfiguring the plurality of keys further includes one of: revealing additional keys that may be used for one of the first function and the second function; and re-mapping the functionality of one or more of the plurality of keys.

28. The method of claim 24 further including selecting, for the first function and the second function, a different one of: a telephone function, a gaming function, a personal digital assistant function, and an Internet browsing function.

29. The method of claim 24, wherein:

the determining further includes determining whether the plurality of keys is arranged in the first configuration, the second configuration, or a third configuration to provide the configuration result; and the presenting further includes presenting, dependent on the configuration result, the graphical interface corresponding, respectively, to the first function, the second function, or a third function corresponding to one of monitoring a telephone function and facilitating a gaming function.

* * * * *

UNITED STATES PATENT AND TRADEMARK OFFICE
CERTIFICATE OF CORRECTION

| | | |
|---|---|---|
| PATENT NO. | : 7,023,421 B2 | Page 1 of 1 |
| APPLICATION NO. | : 10/304712 | |
| DATED | : April 4, 2006 | |
| INVENTOR(S) | : Wong et al. | |

It is certified that error appears in the above-identified patent and that said Letters Patent is hereby corrected as shown below:

Column 10 line 53 please delete "tat" and insert --that--
Column 10 line 56 after "keys" please insert --, outside of and aroud the other portion of the plurality of keys,--
Column 11 line 61 after rotateable please insert -- ,wherein the one or more of the plurality of keys is rotateable around and outside of the portion of the plurality of keys;--

Signed and Sealed this

Ninth Day of January, 2007

JON W. DUDAS
*Director of the United States Patent and Trademark Office*